US008224843B2

(12) United States Patent
Stephens, Jr.

(10) Patent No.: US 8,224,843 B2
(45) Date of Patent: Jul. 17, 2012

(54) COLLABORATIVE, INCREMENTAL SPECIFICATION OF IDENTITIES

(75) Inventor: James H. Stephens, Jr., Austin, TX (US)

(73) Assignee: Morphism LLC, Austin, TX (US)

(*) Notice: Subject to any disclaimer, the term of this patent is extended or adjusted under 35 U.S.C. 154(b) by 238 days.

(21) Appl. No.: 12/539,509

(22) Filed: Aug. 11, 2009

(65) Prior Publication Data

US 2010/0040227 A1 Feb. 18, 2010

Related U.S. Application Data

(60) Provisional application No. 61/088,131, filed on Aug. 12, 2008.

(51) Int. Cl.
*G06F 7/00* (2006.01)

(52) U.S. Cl. ........................................................ 707/769

(58) Field of Classification Search .................. 707/736, 707/769, E17.044, E17.005, E17.014, 999.101
See application file for complete search history.

(56) References Cited

U.S. PATENT DOCUMENTS

| 5,924,096 | A  | * | 7/1999 | Draper et al. ........................ 1/1 |
| 7,281,006 | B2 | * | 10/2007 | Hsu et al. ................ 707/999.006 |
| 7,657,425 | B2 | * | 2/2010 | Ejerhed et al. .................... 704/9 |
| 7,861,154 | B2 | * | 12/2010 | MacLaurin ................... 715/230 |
| 2006/0190461 | A1 | * | 8/2006 | Schaefer ...................... 707/100 |
| 2008/0109428 | A1 | * | 5/2008 | Suciu et al. ....................... 707/5 |
| 2009/0006380 | A1 | * | 1/2009 | Agrawal et al. .................. 707/5 |
| 2009/0070322 | A1 | * | 3/2009 | Salvetti et al. ................... 707/5 |
| 2009/0112856 | A1 | * | 4/2009 | Chun et al. ....................... 707/5 |
| 2009/0254572 | A1 | * | 10/2009 | Redlich et al. .................. 707/10 |
| 2009/0265315 | A1 | * | 10/2009 | Sigurbjornsson et al. ........ 707/3 |
| 2009/0300475 | A1 | * | 12/2009 | Fink et al. ..................... 715/230 |
| 2009/0319608 | A1 | * | 12/2009 | Anil et al. ..................... 709/204 |
| 2011/0191276 | A1 | * | 8/2011 | Cafarella et al. ............... 706/12 |

* cited by examiner

*Primary Examiner* — Robert Timblin
*Assistant Examiner* — Randall Burns
(74) *Attorney, Agent, or Firm* — Hamilton & Terrile, LLP; Robert W. Holland

(57) ABSTRACT

Methods and systems for collaborative, incremental specification of identities are provided. Users of an information processing system collaborate to define and refine identities of entities, and users can create references for those identities. Relationships among the identifiers imply related keywords that can be used to improve search, navigation, and integration. Relationship factoring can be used to maintain efficient logical and physical representations.

19 Claims, 4 Drawing Sheets

Illustration 1 - PRIOR ART

COLLABORATIVE, INCREMENTAL SPECIFICATION OF IDENTITIES

CROSS REFERENCE RELATED APPLICATION

This application claims priority to U.S. Provisional patent application Ser. No. 61/088,131, filed Aug. 12, 2008, and entitled "Method and System for Collaborative, Incremental Specification of Identities", the entire disclosure of which is incorporated herein by reference.

BACKGROUND OF THE INVENTION

1. Field of the Invention

Embodiments of the disclosure related in general to information processing and in particular to collaborative, incremental specification of identities in an information system.

2. Description of the Related Art

Certain multiuser information systems host content provided by their users. To facilitate searching and navigation, this content is often explicitly tagged with keywords, which are sometimes called "tags". These keywords are strings of characters, and their meanings typically depend on the users who assign them to content. A single string of characters can have different meanings for different users. For example, one person's "Paris" might refer to the capital city of France, while another person uses "Paris" to mean the small town of Paris, Tex., U.S.A. For another user, "Paris" could mean a certain celebrity. A user searching for "Paris" could find content relating to all of these topics when only one of these topics was desired.

Some systems organize and integrate content from multiple information processing sources. Ambiguity in terms used to relate content can result in erroneous links. For example, a news story about "Georgia" could refer either to the sovereign nation of Georgia or a state in the Southeastern United States, and sometimes disambiguation heuristics fail (see FIG. 4 Illustration 1).

In some cases, keywords for content are too specific or too general for efficient searches or integration at varying degrees of precision. For example, content tagged with "Paris" will not be found with a search for "France" unless other information links the two strings for the search. Any such linking is vulnerable to the confusion about what "Paris" means. Content relating to a Paris, France but tagged only with "France", will not be found with a simple search for "Paris". To mitigate these deficiencies in part, some content is manually tagged with multiple keywords to reflect decreasing specificity. Equivalently, a search for one keyword is expanded to search for related keywords. However, the potential for confusion about intended meanings of keywords remains.

These obstacles to precise search are not limited to geographical references. Almost any entity or concept has generalizations or refinements. For example, content tagged with "heron" will not be located with a simple search for "bird" or "animal" unless other information is used to relate the concepts. Similarly a simple search for "hawk" will not find content relating to hawks but tagged only with "bird". Furthermore, this behavior occurs with any content references, not just tags. For example, a document that discusses herons without ever referring to "animal" won't be found by a simple search for "animal". Remedies often encounter ambiguity from the operative strings.

When a user wishes to search, navigate, or integrate content originating from multiple systems, these problems are can be compounded due to differences in user communities, divergent keyword syntactic constraints, and other factors. One content system might provide sufficient support for relatively unambiguous terminology, but inter-system ambiguity remains.

SUMMARY OF THE INVENTION

Since the intended meaning of a keyword can be ambiguous for multiple users, there is a need for a shared service for naming things conveniently and relatively precisely in order to reduce ambiguity and increase precision of content retrieval and processing. The present invention provides such a service with several innovations.

[Collaborate to define and refine identities] Users can collaborate to define and refine notions of identity. The scope of what is identified is unlimited: any entity, object, event, region, timespan, plant, animal, group, mathematical structure, characterization, class, artifact, system, behavior, song, photograph, video, document, policy, product, service, speech, joke, disease, condition, theory, etc.—collectively referred to without any limitation as "things". Even a single user can benefit from such definitions and refinements. Benefits include without limitation increased accuracy and efficiency in searches, and improved integration accuracy, and automatic derivation of related keywords.

[Identities and SID's] Here the notion of identity is generalized to the set. A singleton, a set with only one element, corresponds to the element itself. To support incremental refinement, elements can be added, either explicitly or indirectly, to the singleton to form a superset, of which the singleton is then a subset. A benefit is that an initial description or a specification can be refined as distinguishing characteristics are articulated. This ability helps to lower the minimum requirements to begin a specification. A user can easily start with less-than-perfect characterizations, knowing future work can improve things. In this description, such sets are called SID's (for "Set Identifiers") or "identifiers". Two SID's with identical characterizations could be viewed as representing distinct entities. However, presumably at least one of the SID's will benefit from future additional constraints to help distinguish it from the other SID.

[Refinement] An initial characterization for a SID, while perhaps incomplete, could be sufficient for many purposes. However, other uses, users, applications, communities, or contexts—collectively "contexts"—could suggest one or more refinements, which result in one or more new subset or superset SID's. As a result, the collection of SID's increases over time. The notion of SID subsets/supersets gives a directed graph structure to the set of SID's, and that graph grows in breadth and depth.

[References] Creating a SID is different from creating a reference to a SID. The former creates a new set, and the latter identifies an existing set. Multiple references can resolve to a single SID, and a single reference can have several representations. Some embodiments provide references that are composites of language, label, and timestamp. Furthermore, some embodiments provide for references relative to a context. Such relative references act as convenient aliases. Without ambiguity one user's "Paris" can in fact refer to Paris, Tex., while another's "Paris" does not. The flexibility of references and their representations makes references both convenient and precise.

[Unrefinement] Sometimes an author of a document that contains a reference does not want certain readers to be able to resolve that reference completely while still wanting the reader to have some knowledge of the reference. For example, an investigator of a crime might himself know the identity of a victim but he might wish to keep that identity private while still providing some information, such as the victim's gender and city of residence. In such a situation, an author can obtain a superset of the SID, and he can relate that superset to a particular audience. The resulting reference can have the following logical structure:

audience1→reference1, ..., audiencen→referencen

Such an approach is called "targeted unrefinement". Each referencei is called a "unrefiner" for SID X. To ensure that audience1 does not learn reference2 for audience2, some embodiments encrypt each relation independently such that only the respective audiences can only obtain their respective references. Here audience is any specification (or resolvable to a specification) of set of potential readers. Continuing the previous example, a targeted unrefinement for a victim of some crime might include two associations <investigative team>→<Homer Simpson of 472 Evergreen Terrace>, <public>→<Adult male from Springfield>

At least the first association would not be accessible to the public.

[Unrefinement rules] Some embodiments support unrefinement rules, which allow a user (or community, context, system, etc) to specify that some audience should only see unrefinements of certain references—perhaps only in certain contexts. In general, an unrefinement rule comprises a characterization of the authors who wish to use the rule, a target audience for the rule's effect, a specification for the SID's to be unrefined, a specification for mapping each SID to its unrefinement, and optionally other parameters, context, or scope. A particular instance of the rule can be very explicit:

Investigators restrict Public references to Homer Simpson as 'Adult Male from Springfield'.

The rule X.subjectOf=Y & Y.isA=Investigation Investigators to restrict Public references to X as X.gender, which unrefines subjects of investigations to references to gender in public contents, would be applicable to any subject in an investigation. Since a SID can have many supersets, specifying general approach for finding an appropriate unrefinement for an arbitrary SID can be challenging. As a result, default unrefinements for particular SID's can optionally be specified either explicitly or via a rule. When an unrefinement for a SID X is needed, a search can start at SID X and continue up the chain of supersets to find a SID Y, if any, that is marked as an unrefinement. Then SID Y is returned as the refinement. For example, SID's for "Adult Male Person" and "Adult Female Person" could be marked as unrefinements, and these SID's could be used as the unrefinements for any subset SID (assuming no intermediate SID is marked as an unrefinement).

[Reference service] To facilitate reference generation, a reference service is optionally available. A user identifies a SID to be referenced. The user provides any other parameters required for the reference. These parameters could comprise without limitation targeted unrefinements, a timestamp, the format or representation of the reference, and/or a language identifier. Optionally the user also provides other information such as the user's identity and/or the location of the content that will use the reference. Then the service generates a string of characters that can be decoded and resolved to the SID (or a refinement). Some such services store some or all of the additional information provided. This information can be used in several ways such as notifying users of changes relating to the SID or providing a list of content that references the SID.

[Related keywords] Some embodiments use their knowledge of SID's to provide related keywords, including more general keywords as well as similar keywords. A document that references a SID for "sparrow" is also related to the SID for "birds". A soccer match is related to soccer and sports. Granite is a mineral and an igneous rock. In each case, the related keywords can be derived from the supersets of the initial SID. With these derived keywords, content in conventional systems can be automatically tagged when additional tags aid search, integration, or navigation. Similarly, some embodiments can suggest similar keywords. "Sparrow" is possibly related to "hawk" since both things are subsets of a SID for birds. Additionally, information, such as a textual description, about a given SID can suggest related SID's, either by reference or indirectly.

[Tuples] SID's are typically specified or "annotated" in terms of object, property, relation, and value, which, together with an statement ID, form an statement tuple, also referred to as an "statement", "annotation", or a "tuple" when the context is clear. For notational convenience, each component is sometimes referenced by it's first letter:

s=statement ID, o=object, p=property, r=relation, v=value

The sentence "Homer likes donuts" could be represented with

Homer.likes=donuts where o=<Homer> (in abbreviation for this example)
p=<likes>
r=<=>
v=<donuts> and the notation <X> means a identifier for the entity X. In this discussion, X is often used by itself to mean <X>. Additionally, the statement ID associated with the statement is sometimes denoted a "s", so the general logical form for a tuple is typically s: o.p r v When necessary, higher-arity relationships are typically reified. Typical embodiments maintain a history of changes to tuples in order to reconstruct the state of the set of tuples at a time in the past.

An embodiment's representation of tuples can use one or more of several datastructures, including tables, matrices, tree-based indexes, and graph structures.

[Detecting redundancy] With large-scale collaboration—especially in different languages—two distinct SID's that are intended to represent a single thing could come to exist. Some embodiments attempt to detect such redundant SID's. For redundant SID's at least partially characterized in different languages, some embodiments use language translators to translate characterizations to determine the degree of similarity. Though translations might not result in an exact match for redundant data, substantial similarities indicate potential redundancy. Additionally, these embodiments can consider the supersets of the SID's in question. If two SID's are determined, either by user or a system, to be equivalent in their intended scope, that finding is typically stored explicitly. Additionally, one of the SID's is typically promoted to be the preferred SID for future use.

[Worlds] A set of statements is a "world", and a world, being a set, can have subsets, which are called "subworlds". Some embodiments have a distinguished world to serve as a shared, public world, which is denoted here as the CurrentPublicWorld or "CPW". The CPW is typically the world that most users access. Since a world is a set of assertions, it can serve as a convenient point for access control for assertions. Additional, worlds can serve as ephemeral contexts for queries or other operations. In such a role, the world essentially maintains a set of assumptions to be used for the operations.

[Knowledge rules] Some embodiments support knowledge rules, which, when applied to a set of statements, can imply additional statements. For example, the rule Tree.subset=X→Plant.subset.X applied to the statements Tree.subset=Oak
Tree.subset.Mesquite yields these additional statements Plant.subset=Oak
Plant.subset=Mesquite Embodiments that support rules offer one or more rule systems for the specification of the rules. Horn clauses, Datalog, Prolog, limited first-order predicate calculus, first-order predicate calculus, higher-order predicate calculus, their equivalents and variations, and others are possible. Knowledge rules are typically treated as statements themselves and, therefore, can exist within worlds.

[Representation rules] Some embodiments provide representation rules to map between the logical and physical representations of datasources, some of which are remote. The physical side of a representation rule is specified in a language capable of operation required. For example, a write representation rule might have the form s o p r v→INSERT INTO tuples VALUES (s, o, p, r, v)

for a simple table in a conventional database. Alternately, the same relationships may be represented in a graph database or other data storage systems. Logical tuples with equality as the relational can be read from the same structure with the example read representation rule s o p r v←SELECT st_id, ob_id, prop_id, id('='), value FROM tuples where 'id( )' is a function that maps strings to logical identifiers. When query parameters are provided, a more specific rule might apply:

s [o] [p] r v←SELECT st_id, ob_id, prop_id, id('='), value FROM tuples
WHERE ob_id=o AND prop_id=p Such rules typically utilize functions to map values to and from the physical representation. With such functions, these representation rules form an abstraction layer that allows their embodiments to tailor—and change—physical representations of data sources to reduce resource utilization. These rules allow allow certain embodiments to connect with external systems that use different interfaces, representations, or both.

[Datasources] Some embodiments integrate or aggregate data from multiple remote datasources. Many datasources maintain their own canonical identifiers for objects. For example, datasources relating to books might use ISBN's (International Standard Book Numbers). In these cases, those identifiers can be mapped to identifiers in the embodiment. Furthermore, an embodiment could generate references that are convenient for users who are familiar with the datasources identifiers. For example, a reference like "ISBN13=978-0961392116" could be convenient to identify books with the new ISBN-13 identifiers. By integrating multiple sources of identity, an embodiment can provide a comprehensive directory for multiple users.

[Physical representations] To reduce resource use, many embodiments make aggressive use of tuple partitioning. A tuple's property or world are suitable for a partition key, and the resulting partitions can be subpartitioned. Another physical layout optimization is inlining, where a property of tuple is stored with the tuple itself. For example, the two statements s1: x1.p1 r1 v1
s2: s1 inWorld=w1 could in part be combined into a single physical tuple with the world property inlined:

$s_1 x_1 p_1 r_1 v_1 w_1$

Such a representation can be convenient for queries against one or more specific worlds. For embodiments with a CurrentPublicWorld(s) in addition to other words, CPW's tuples can be stored in separate structures from the non-public worlds. Embodiments that support historical queries, queries which consult data as it existed at some point in time in the past, can utilize specific structures for that data. For example, 'createdOn' and 'deletedOn' property values could be inlined. Inlining and similar techniques are often accompanied by representation rules in order to provide a lossless, bidirectional map between logical and physical representations.

[Factoring] To maintain efficient representations, some embodiments support factoring that reorganizes SID specifications. A reorganization should result in a more compact representation of a group of SID's at some time after the reorganization. For example, consider two SID's X and Y. Assume that SID X has properties A, B, and C, and SID Y has property A, B, and C. Also assume that both SID's are subsets of SID Z. SID's X and Y could be refactored with the introduction of a new SID W:

X: C and W.subset=X
Y: D and W.subset=Y
W: A, B and Z.subset=W

Another type of factoring reorganizes tuples that individually belong to two worlds. Such factoring results in tuples that each belong to a single world. In conjunction, this factoring often creates additional intermediate worlds to enable such a representation. Other factoring schemes are possible.

[Access control rules] Some embodiment can restrict access to tuples based on various criteria including but not limited to a user's identity, qualifications, or memberships. Some access control is explicit:

<group X>.canRead=s1 (Only people in Group X can read the s1 tuple)
Executives.canReadProperty=salary (Only executives can see salaries)

Other access control can be derived from rules. For example, the rule

X.isA=SpyMaster & Y.isA=SecretAgent S:Y.address=A→X.canRead=S could mean that only Spy Masters can read the addresses of Secret Agents.

DETAILED DESCRIPTION

In the description that follows the embodiments will be described in reference to collaborative, incremental specification of identities. However, the scope of the invention is not limited to any particular environment, application, or specific implementation. Therefore, the description of the embodiments that follows is for purposes of illustration and not limitation.

These example embodiments comprise an information system with least one computer with a processing components operable to perform the steps performed by the embodiment. Typical embodiments perform steps on multiple components, and storage is performed by multiple storage components.

Figure 1:
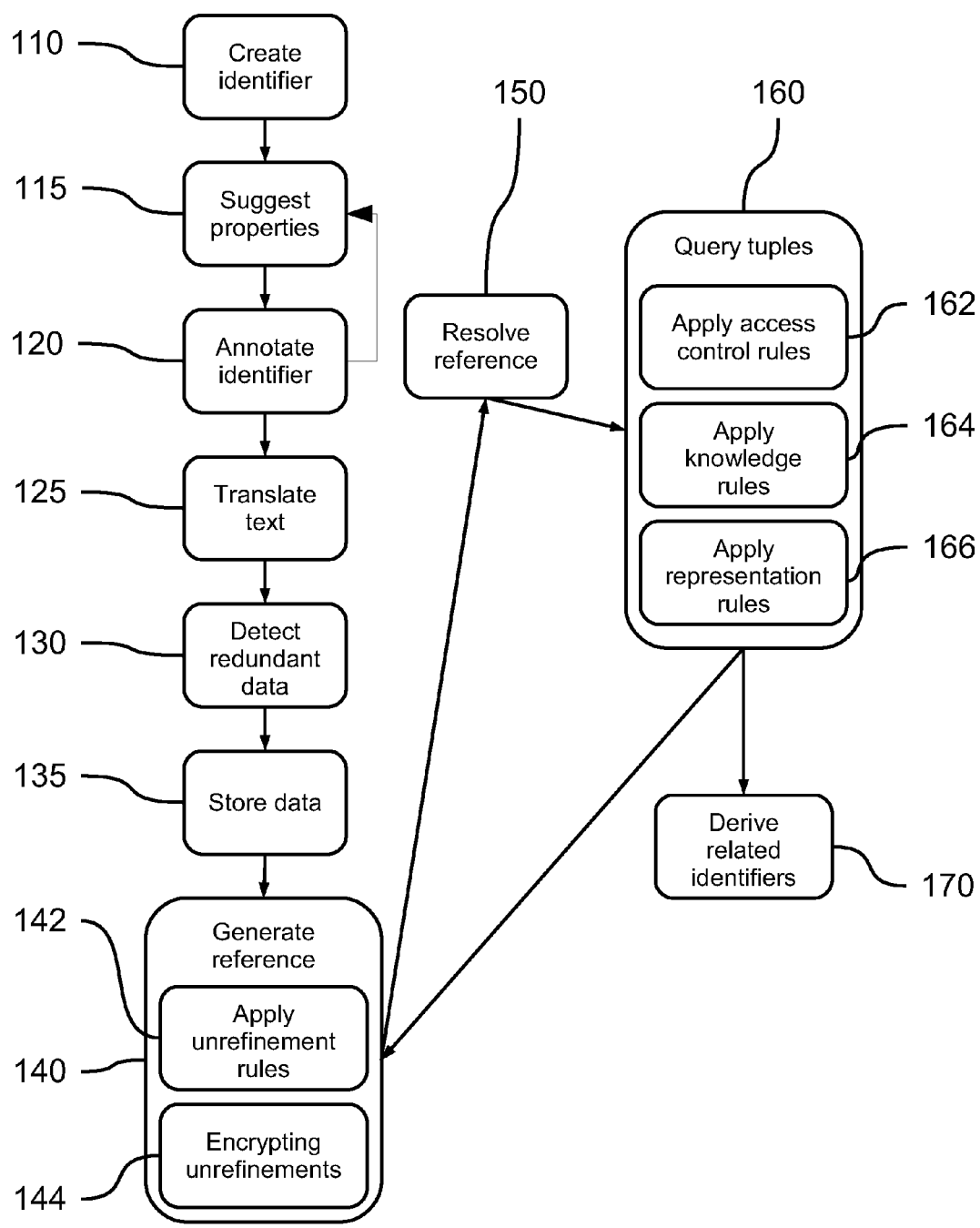
FIG. 1 is a flow chart illustrating steps performed by an embodiment of the present invention.

In step 110 in FIG. 1, a user or a component creates an identifier, also referred to as a SID. Initially, the SID can be naked in the sense that it has no statements that reference it. Subsequently the SID is annotated in step 120. In conjunction with step 120, step 115, which is optional, offers suggested properties for future statements relating to the SID. A new annotation, such as a tuple, for a SID might result in one or more new suggestions for properties for that SID or another SID.

These suggested properties can be derived from the properties of similar SID's. For example, if a new SID X is a subset of a SID Y and if many of SID Y's current subsets each have annotations for property P, then P can be suggested for SID X. Additionally or alternately, a property can be marked as typical for subsets of a given SID. For example Person.hasProperty=lastName can mean that (many) people have last names. Other forms for property suggestion are also possible. Furthermore, some embodiments can require certain properties before accepting a specification for a SID. These embodiments typically evaluate all requirements for a new SID, set of new SID's, or a batch of new or modified annotations in a verification step.

Step 120 optionally checks to see if properties have been approved for use. With a large community of users, the chances of ill-advised vocabularies of properties increase. As a result, step 120 can optionally require that any property be approved for use before it is stored. This editorial step reduces the occurrence of problematic property use.

Step 125 translates string values to string values in other languages. Since translation errors will occur, human users can correct or improve translations incrementally as desired. In the meantime, the approximate translations help users discover SID's using other languages. Some embodiments create duplicate tuples to store these translations; however, a typical embodiment instead uses structures similar to message catalogs or string intern tables.

Step 130 searches for redundant data in order to reduce the redundant data that enters the system. In a simple case, an embodiment can determine that two tuples are redundant if they each have exactly the same values in each position. Two tuples might be marked as "likely redundant" if the agree relative to a translation of a values in one or more positions. Two SID's could be marked as redundant if they are referenced by tuples that are pairwise redundant relative to those SID's. More generally: a SID that is a subspecification of another SID could be marked as redundant. SID X is a sub-specification of SID Y if the set of all tuples mentioning X in a subset is a redundant subset, relative to X, of all tuples mentioning Y.

In step 130, the annotations are stored for future retrieval. This storage need not be long-term. For example, for a what-if, hypothetical query, annotations could be posited for the duration of one or more queries and then subsequently discarded.

Since the amount of data used to store tuples and other information can be very large in some embodiments, this data is often partitioned to facilitate concurrent access and smaller storage components. Some embodiments store their tuples in multiple structures based on the tuple's world memberships. In particular, some embodiments use separate structures, or collections of structures, for a CurrentPublicWorld, other worlds, and historical data. Additionally, an embodiment can further partition the data based on tuple properties, date ranges for tuple creation and deletion, values of the 'object' position in the tuples, and other factors.

As discussed previously, step 140 generates a reference to a SID. During this step, step 140, which applies any relevant unrefinement rules, is applied. Additionally, if a reference will utilized more than one targeted unrefinement, then step 144 can encrypt those unrefinements according to one or more encryption schemes that allow only the intended audiences to obtain their respective unrefinement. Some embodiments use public key cryptography to encrypt at least one targeted unrefinement in a reference. Other encryption schemes are possible.

Step 150 resolves a given SID reference to the intended SID (or a refinement). Typically this resolution searches for a label provided by this reference, and this search could be qualified by a language specification provided by the reference. More generally, the resolution can proceed by looking for a property, value, and languages for one or both, as specified by the reference. Additionally resolution can require using a timestamp extracted from the reference to obtain the state that existed at the time the reference was created. When resolution fails to obtain a unique referent, the result set obtained can be provided.

Step 160 processes a query over tuples to return a set of those tuples. Steps 162, 164, and 166 are independently optional. Step 162 applies access control rules either to restrict the set of tuples queried, restrict the data returned by the search, or both. Step 164 applies relevant knowledge rules to obtain zero or more additional tuples to search. Similarly, step 166 applies relevant representation rules to obtain zero or more additional tuples. Step 162 can occur before steps 164 and 166 in order to filter rules before application, and step 162 can also occur after steps 164 and 166 to filter the results of those steps. Note that step 160 is useful on its own in order to locate a SID for a particular thing (if such a SID's exists) referenced by the found tuples. In this manner, a user can use step 160 to find the relatively unambiguous identifier. Once that identifier is obtained, the user can use step 140 to generate a reference to it.

In step 170, related identifiers are derived from query results. These related identifiers can play the role of related keywords discussed previously. Typically related identifiers are of two kinds: "generalization identifiers" and "similar identifiers". The former are generalizations of the given identifier, and the latter are analogous to peers. For example, a query for a SID for "hawk" could find generalization identifiers <bird> and <animal> via a query for supersets of the given "hawk" SID. Similar identifiers could be obtained from subsets of the given identifier or from subsets of a superset of the identifier. For example, <falcon> and <eagle> might be similar identifiers for <hawk> due to those identifier's subset proximity to <hawk>. The results of step 170 can be used to expand the set of tags for some content or expand a query for content.

Figure 2:
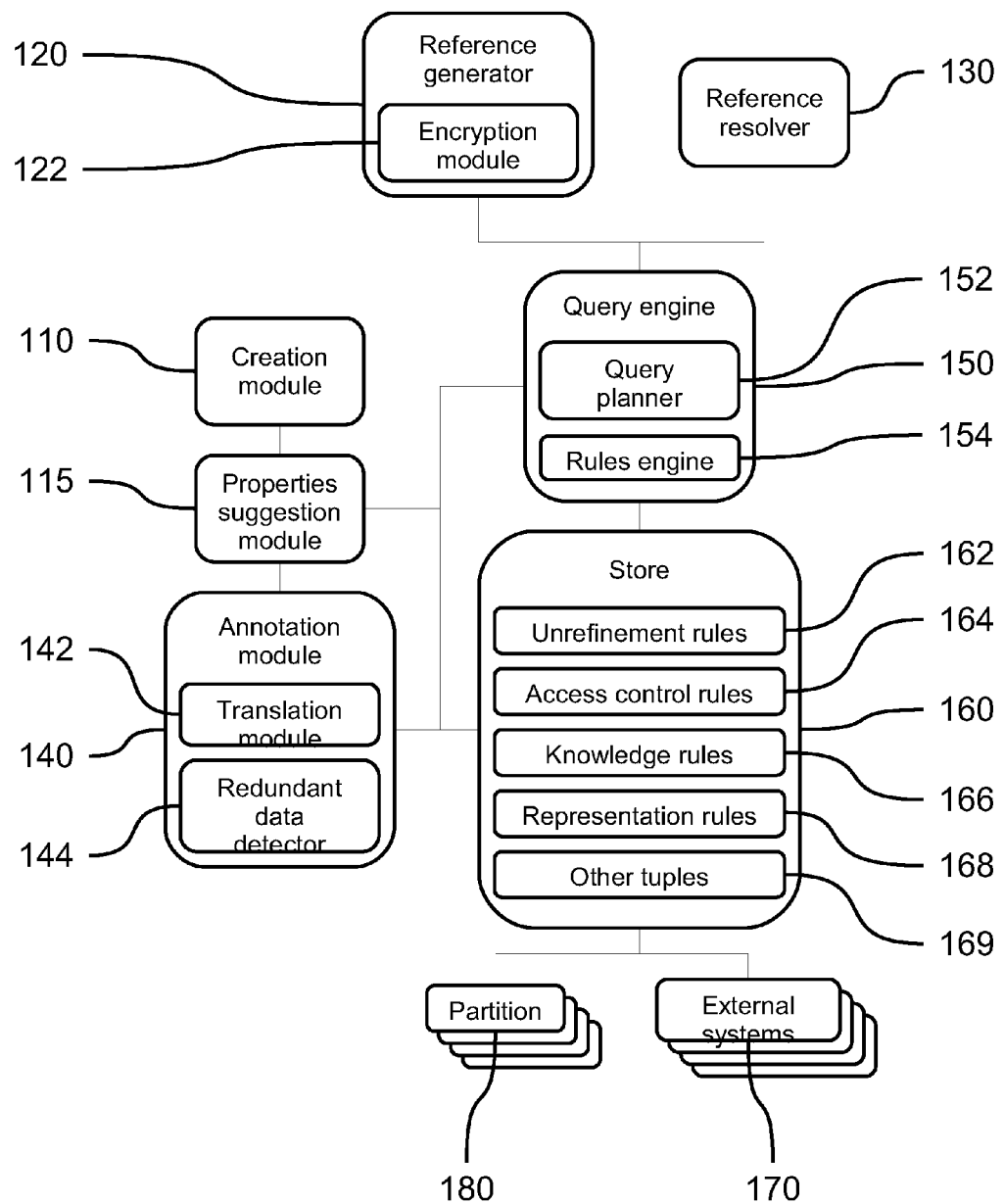
FIG. 2 illustrates an embodiment of a system for collaborative, increment specification of identity.

FIG. 2 illustrates a system for collaborative, incremental specification of identities. Identifiers, or SID's, are created by creation module 110. Creation comprises generating a unique ID, which itself can have components to facilitate extracting a namespace or other context from the ID. After an identifier is created, annotation module 140, optionally in conjunction with properties suggestion module 115, allows the user to annotate the identifier using tuples. Translation module 140 optionally translates strings of characters used in the annotations to at least one other language, and redundant data detector 144 searches for redundant data as described previously. Data determined to be redundant can be deleted, perhaps with historical archiving, or marked for review. Annotations and associated data are written to store 160, which typically partitions the data into multiple partitions 180 based on tuple property, world, author, or other factors. Additionally, certain data can be propagated to external systems 170.

When an external reference for an identifier is required, reference generator 120 generates a reference as discussed previously. Rules engine 154 can be used to apply unrefinement rules to generate any required unrefinements. Reference generator 120 can then encode the reference to produce a reference representation that meets various constraints such as character set and syntax. Additionally, encryption module 122 can encrypt references. In particular, some embodiments use public key cryptography to encrypt one or more unrefinements. Typical embodiments obtain public keys from remote components.

Reference resolver 130 parses reference representations and resolves the reference to zero or more identifiers. As discussed previously, resolution can proceed by considering explicit or implicit properties, values, worlds, timestamps, language specifications, and other parameters provided by a reference as well as other associated context, such as but not limited to user, author, or content.

Query engine 150 processes a query over a set of tuples. In order to plan consultation of indexes and other data in partitions 180, query engine 150 uses query planner 152, which has knowledge of statistics, organization, and performance of the structures used to store the data. Additionally this embodiment uses rule engine 154 to apply access control rules 164, knowledge rules 166, and representation rules 168 described previously. The application of representation rules 168 can result in store 160 obtaining data from external systems 170.

In typical embodiments, the operation of the system is distributed across multiple components that are connected via communication channels. For example, translation and encryption are sometimes performed on components dedicated to those purposes. Similar, for large-scale data, storage is distributed across many distinct memory components such as hard disks. Some remote datasources are provided by servers accessed via TCP/IP networks.

Figure 3:
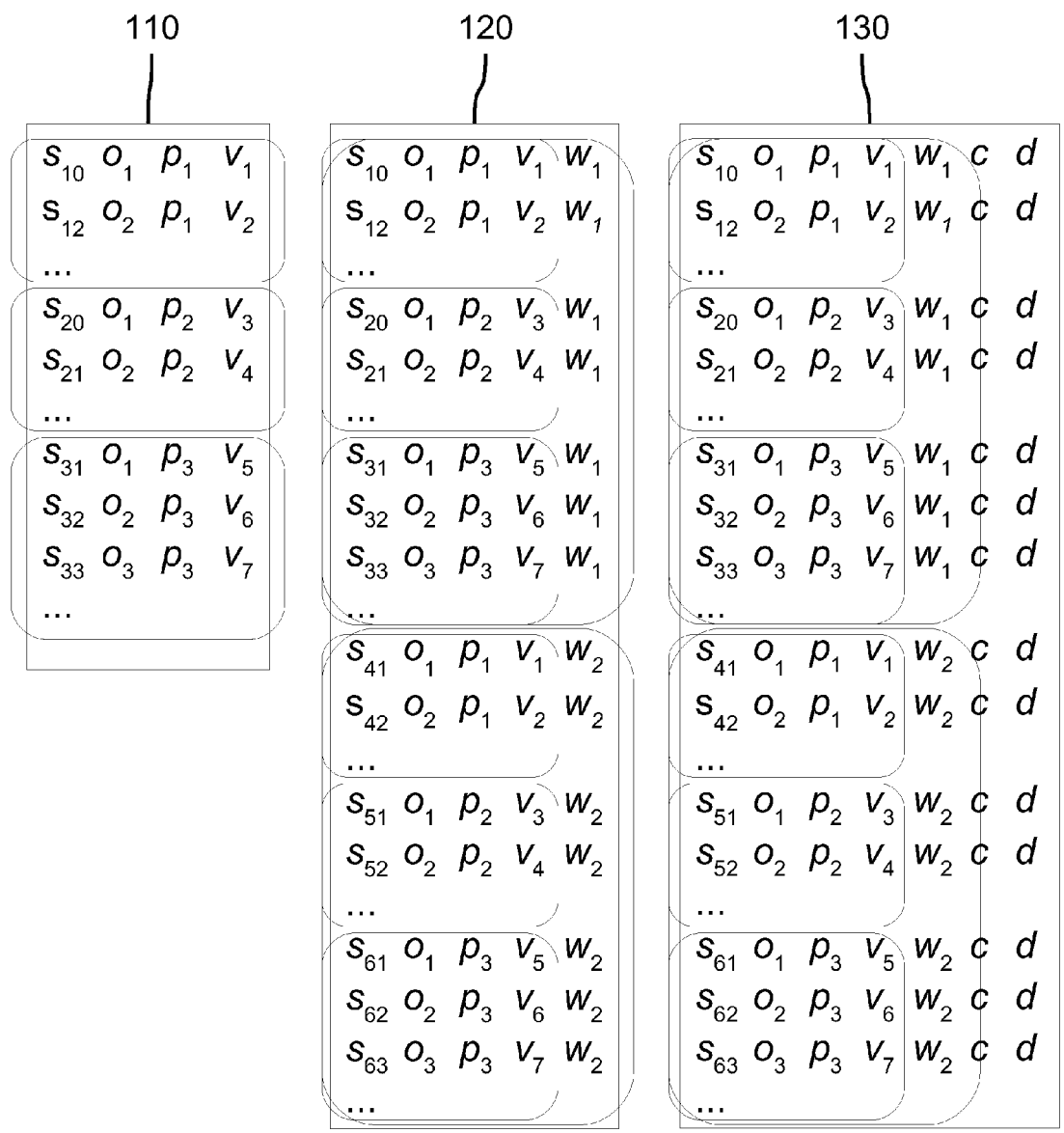
FIG. 3 illustrates example tuple partitions.
Figure 4:
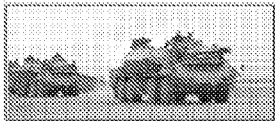
FIG. 4 illustrates an example of prior art that confused the state of Georgia in the United States and the sovereign nation of Georgia. A news story referenced "Georgia", which referred to the sovereign nation of that name, but the displayed page incorporated a map depicting the state of Georgia in the United States. Russian troops did not surge into the southern part Georgia in the United States.

FIG. 3 illustrates one of several partitioning schemes for tuple data. This figure presents data in the logical structure of a matrices or tables; however, graphs or other structures are suitable for embodiments. Structure 110 represents a CurrentPublicWorld, with partitions defined by the properties of the tuples. Typically each partition stores tuples with a specified property; however, partitions can also be defined by property ranges. For a compact representation, properties are typically interned, resulting in integers or a similar compact scalar as canonical identifiers for the properties. Additionally, these integers can be Huffman-coded based on either the number of tuples for each property, the expected frequency of query for each property, or a combination of those measures. Alternately or in combination, other data, such as the tuples' object parameters, can define subpartitions. The partitions and optionally subpartitions themselves are typically distributed across distinct physical media, such a hard disk drives or other memory systems, to enable concurrent access.

Structure 120 represents tuples in worlds other than the CurrentPublicWorld. In this example embodiment, the primary partitions are based on the world associated with each tuple. A tuple that exists independently in two worlds is represented twice. Additionally these partitions are subpartitioned based on property. However, subpartitions could be based on other data such as the tuples' object parameters. Again, the partitions are typically distributed across physical storage devices.

Structure 130 is an illustration of a representation of historical tuple data. In this example embodiment, when a tuple is deleted, it is migrated from either structure 110 or structure 120 to structure 130, where it is itself annotated with a deletion timestamp d. The parameter c represents the creation time for each tuple. (In this illustration, each c and d can have different values.) In some embodiments, historical queries, those that ask about the state of world at some previous point in time, resemble geographical information system queries, which are typically based on two coordinates such as latitude and longitude. Here the two coordinates are creation time and deletion time, with the added constraint that deletion time is not less than the creation time. Additionally, tuple deletion is typically much rarer than tuple creation, and that asymmetry can be exploited. For example, some embodiments store structure 130 in two units: all tuples and deleted tuples, and historical queries join those two based on tuple statement ID's. Alternately, the two units consist of all tuples that haven't been deleted and tuples that have. In this instance, a historical query considers all tuples in the first unit before a given point in time and then removes any such tuples according to their order in the second unit. In any case, subpartitioning typically proceeds as described previously.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise, it will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations wilt be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof it will be apparent that modifications and variations are possible without departing from the scope of the invention defined in the appended claims.

What is claimed is:

1. A computer-implementable method for incremental specification of identities in a computer network, the method comprising:
    creating set identifiers;
    annotating identifiers using objects, properties, relations, values, and tuples in at least one set of statements;
    storing data representing the tuples;
    querying the tuples in at least one ephemeral context comprising additional tuples as query assumptions and access control;
    applying knowledge rules within the ephemeral context to derive derived tuples, the knowledge rules comprising additional tuples;
    applying representation rules within the ephemeral context to derive logical tuples from data in other representations, the representation rules mapping between logical and physical representations;
    applying access control rules within the ephemeral context to limit or grant access to certain tuples;
    generating a reference for a set identifier;
    resolving the reference to determine a corresponding identifier; and
    deriving related identifiers for a set identifier based on the tuples.

2. The method of claim 1, wherein the resolving uses a timestamp, a context, and a label relative to the context.

3. The method of claim 2, wherein the reference further comprises a language indicator.

4. The method of claim 1, the method further comprising relating a location for content that uses the reference with the reference.

5. The method of claim 1, the method further comprising relating the author or editor of content that uses the reference with the reference.

6. The method of claim 1, the reference comprising targeted unrefinements having a structure comprising unrefiners.

7. The method of claim 6, wherein the generating comprises encrypting at least one targeted unrefinement having structures comprising unrefiners.

8. The method of claim 7, wherein the encrypting comprises public key encryption.

9. The method of claim 1, wherein the resolving is followed by retrieving annotations that existed for the identifier at the time the reference to the identifier was generated.

10. The method of claim 1, wherein the related identifiers comprise similar identifiers related as peers.

11. The method of claim 1, wherein the related identifiers comprise generalization identifiers not distinguished from other identifiers.

12. The method of claim 1, the method further comprising updating the tuples based on remote data sources and associated representation rules.

13. The method of claim 1, the method further comprising suggesting properties for annotation of the identifiers, wherein the suggesting is based on properties of similar identifiers based on subsets of supersets of the identifiers.

14. The method of claim 1, wherein a tuple comprises a specification for a property that must be approved prior to first use as a property in any other tuples.

15. The method of claim 1, the method further comprising automatically translating textual annotations into at least one other language.

16. The method of claim 1, the method further comprising detecting identifiers referenced by tuples that are pairwise redundant relative to those identifiers.

17. The method of claim 1, the method further comprising factoring tuples, wherein the factoring comprises the introduction of a new identifier, which is related to existing identifiers via multiple subset relationships.

18. A system comprising a processor, a data bus coupled to the processor, and non-transitory computer-usable medium embodying computer program code and coupled to the data bus, the computer program code for:
    creating set identifiers;
    annotating identifiers using objects, properties, relations, values, and tuples in at least one set of statements;
    storing data representing the tuples;
    querying the tuples in at least one ephemeral context comprising additional tuples as query assumptions and access control;
    applying knowledge rules within the ephemeral context to derive derived tuples, the knowledge rules comprising additional tuples;
    applying representation rules within the ephemeral context to derive logical tuples from data in other representations, the representation rules mapping between logical and physical representations;
    applying access control rules within the ephemeral context to limit or grant access to certain tuples;
    generating a reference for a set identifier;
    resolving the reference to determine a corresponding identifier; and
    deriving related identifiers for a set identifier based on the tuples.

19. A non-transitory computer-usable medium embodying computer program code, the computer program code comprising:
    memory storing computer executable instructions configured for:
    creating set identifiers;
    annotating identifiers using objects, properties, relations, values, and tuples in at least one set of statements;
    storing data representing the tuples;
    querying the tuples in at least one ephemeral context comprising additional tuples as query assumptions and access control;
    applying knowledge rules within the ephemeral context to derive derived tuples, the knowledge rules comprising additional tuples;
    applying representation rules within the ephemeral context to derive logical tuples from data in other representations, the representation rules mapping between logical and physical representations;
    applying access control rules within the ephemeral context to limit or grant access to certain tuples;
    generating a reference for a set identifier;
    resolving the reference to determine a corresponding identifier; and
    deriving related identifiers for a set identifier based on the tuples.

* * * * *